(12) United States Patent
Shimatani

(10) Patent No.: US 6,476,992 B1
(45) Date of Patent: Nov. 5, 2002

(54) MAGNETIC DISK APPARATUS AND OPTIMUM OFFSET MEASURING METHOD

(75) Inventor: Keiji Shimatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/452,839

(22) Filed: Dec. 6, 1999

(30) Foreign Application Priority Data

Jul. 8, 1999 (JP) .......................................... 11-194191

(51) Int. Cl.[7] ................................................. G11B 5/09
(52) U.S. Cl. .............................. 360/46; 360/31; 360/65; 360/75
(58) Field of Search ............................ 360/66, 75, 55, 360/53, 31, 25, 46, 65

(56) References Cited

U.S. PATENT DOCUMENTS

| | | | |
|---|---|---|---|
| 5,831,782 A | 11/1998 | Kohno et al. ................. | 360/66 |
| 6,025,712 A | * 2/2000 | Mian .......................... | 324/210 |
| 6,141,168 A | * 10/2000 | Takahashi et al. ............. | 360/66 |
| 6,249,399 B1 | * 6/2001 | Chainer et al. ................ | 360/75 |

FOREIGN PATENT DOCUMENTS

JP        7220257        8/1995

* cited by examiner

Primary Examiner—Regina N. Holder
Assistant Examiner—Mitchell Slavitt
(74) Attorney, Agent, or Firm—Greer, Burns & Crain, Ltd.

(57) ABSTRACT

A magnetic disk apparatus has a measuring pattern writing unit and an optimum offset measuring unit. The measuring pattern writing unit writes random patterns to adjacent tracks on both sides of a measuring track and, thereafter, writes a preamble pattern in which PR4 equalizing characteristics are normally obtained even if simple low pass filter characteristics have initially been set. The optimum offset measuring unit obtains a mean square error per sample obtained by dividing the sum $\Sigma(y-W)^2$ of the squares of differences between sampling values y which were PR4 equalized and a predetermined ideal sampling value W in which there is no noise by the number of samples (N) while changing an offset amount, and determines an offset in which the mean square error is the minimum as an optimum offset.

20 Claims, 12 Drawing Sheets

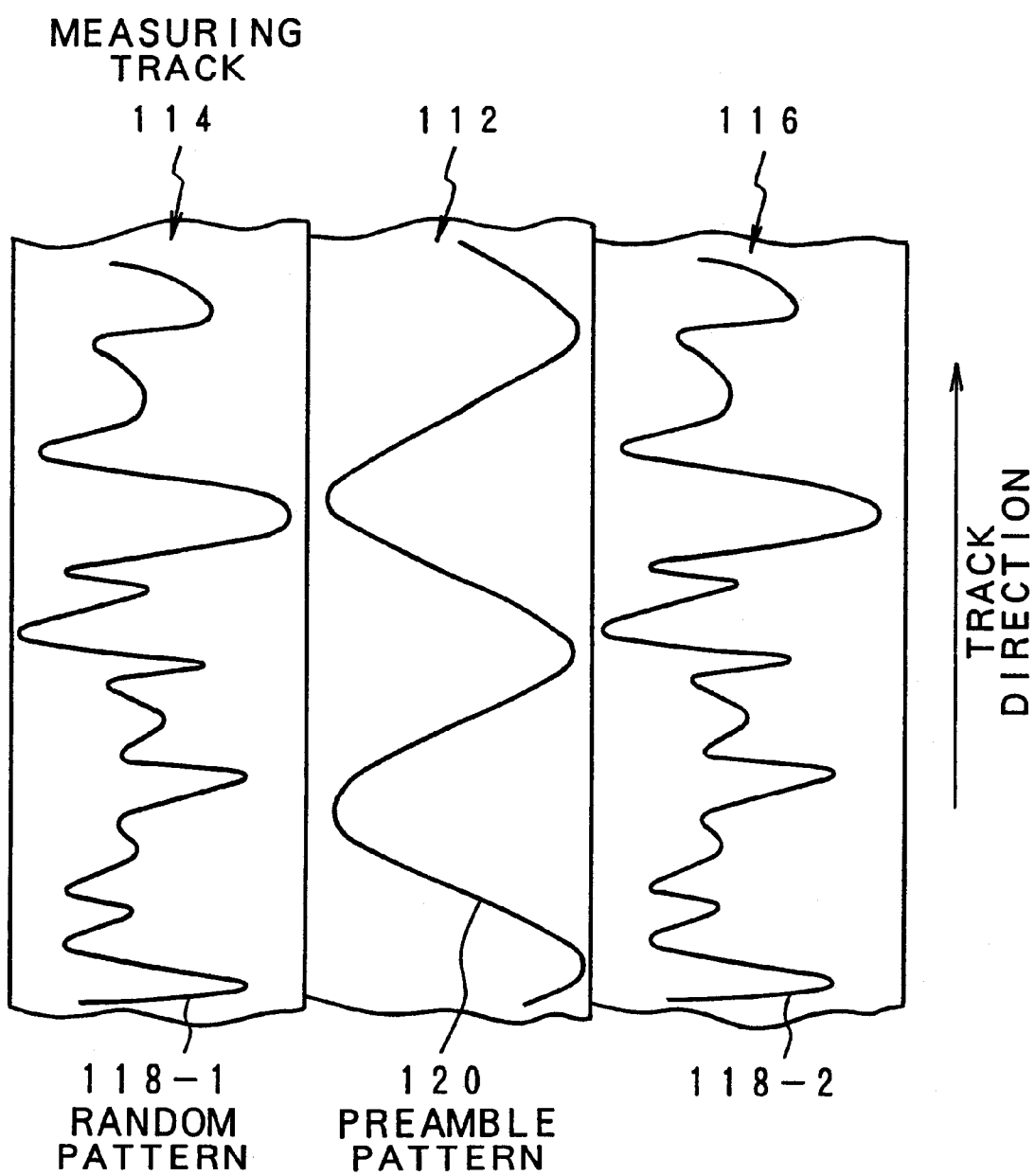

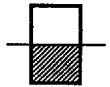
FIG. 10B
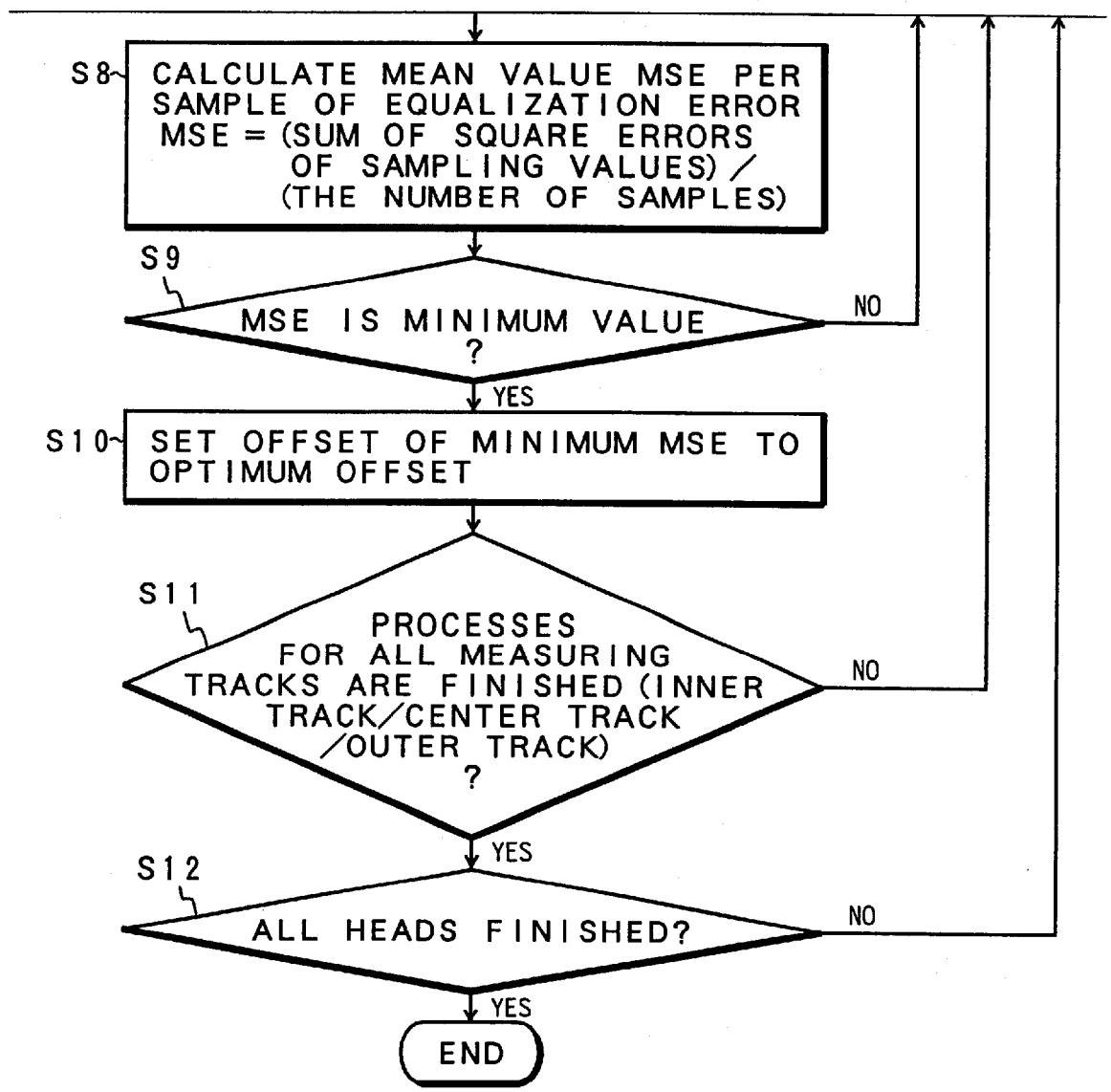

MAGNETIC DISK APPARATUS AND OPTIMUM OFFSET MEASURING METHOD

BACKGROUND OF THE INVENTION

1. Field of the Invention

The present invention relates to a magnetic disk apparatus using combination heads in each of which a write head and a read head are arranged at an edge of a rotary actuator and relates to an offset measuring method of such an apparatus. More particularly, the invention relates to a magnetic disk apparatus for accurately measuring an offset caused by a core deviation between the write head and the read head in a default state of apparatus parameters and relates to an offset measuring method of such an apparatus.

2. Description of the Related Arts

As a head which is currently used in a magnetic disk apparatus, a combination head in which a read only MR head and a write only inductive head are arranged is used. The combination head is supported at an edge of an actuator, moved in the radial direction which transverses medium tracks, and positioned. Further, a data surface servo in which servo frames on which position information had been recorded have previously been arranged on a data surface of the medium at predetermined intervals in the direction of tracks is used. Therefore, when data is written, the data is written onto the medium by the inductive head in a state where the center of the MR head is positioned to the track center so as to enter an on-track state by a position signal demodulated from a reproduction signal of the MR head. In the reading mode for reproducing the data written on the medium, in a state where the center of the MR head is positioned to the track center so as to enter an on-track state by the position signal demodulated from the reproduction signal of the MR head, the data is read out from the medium by the MR head and demodulated. Since the write head and the read head are separately arranged on the combination head as mentioned above, a deviation generally occurs between the write center position of the write head at the time of the data writing and the read center position of the read head at the time of the data reading. It is, therefore, necessary to previously measure a deviation amount between the write center position and the read center position and perform a control to position the read head to the write center by offsetting it by such a deviation amount when the data is read out. According to a method of measuring such an offset amount, first, random data is written as a reference signal indicating the position of the write head, after that, the data is read out while the read head is gradually offset, and the center of a range of the offset amount in which an error rate is the minimum or the offset amount in which no error occurs is set to the optimum offset amount.

However, in the measurement of the offset caused by such a separate arrangement of the write head and the read head, even when parameters of a read channel are set as default parameters, the data has to be accurately read out to a certain extent. This is because since the data written on the medium is used for adjustment of the parameters of the read channel, the parameters for adjustment written on the medium have to be able to be read out by the default parameters before adjustment of the parameters. In the conventional read channel, since the number of parameters which need the adjustment by the data read out from the medium is relatively small, an error rate of a certain degree can be assured even in the setting state of default. In recent years, however, owing to the progress of the read channel, even in case of a low S/N ratio, an error rate equivalent to the conventional one can be assured. The setting of parameters, however, becomes fine by an amount of such progress. In the default setting state in which the parameters are not adjusted at all, it is a present situation that no data can be read out. As for the evaluation in the measurement of the offset caused by the separate arrangement of the write head and the read head, it is a general way that a data correcting function by an ECC is used and an offset amount in which one track is read and the number of sectors in which errors that cannot be corrected by the ECC occurred, namely, a sector error rate when one cylinder is read becomes the minimum, or the center of a range of the offset in which uncorrectable errors are not generated is set to the optimum offset amount. This is because the discrimination about whether the correction of the ECC is possible or not can be performed by hardware, and the deterioration of the error rate due to unadjustment of the parameters of the read channel can be compensated by the ECC. However, there is a problem that the evaluation by the error rate of the ECC is weak for a medium defect. That is, it is assumed that at the time of offset measurement, a medium defect locally exists on either one of the sides of the measuring track, for example, on the outer side in the disk radial direction. In this case, when the position of the read head is close to the outer side, a burst error occurs by the medium defect on the outer side and it cannot be corrected by the ECC, so that the error rate deteriorates. Consequently, the normal error rate is evaluated by the ECC in the area on the inner side where there is no defect. The optimum offset amount in this case is deviated to the inner side as compared with the inherent optimum offset amount in the case where there is no medium defect, and it is weak for the medium defect.

SUMMARY OF THE INVENTION

According to the invention, there is provided a magnetic disk apparatus in which parameters of a read channel can be easily set at the time of measurement and, even when there is a medium defect or the like, an optimum offset can be accurately obtained in a default setting state and to provide an offset measuring method of such an apparatus.

First, according to the invention, there is provided a magnetic disk apparatus which has combination heads formed by arranging read heads and write heads at an edge of an actuator and in which information is recorded or reproduced while the head is positioned to a target track so as to enter an on-track state on the basis of a position signal of a medium demodulated from a reproduction signal of the read head, further upon reproduction, the reproduction signal from the read head is equalized to a Partial Response waveform, and after that, it is maximum likelihood detected, thereby demodulating information. According to the invention, a measurement pattern writing unit and an optimum offset measuring unit are provided for the magnetic disk apparatus. The measurement pattern writing unit writes random patterns to adjacent tracks locating on both sides of a measuring track whose offset is measured, or writes a preamble pattern. The optimum offset measuring unit obtains the sum $\Sigma(y-W)^2$ of the squares of errors between sampling values y of a Partial Response waveform obtained by equalizing the reproduction signal of the preamble pattern and a predetermined ideal sampling value W in the case where there is no noise while changing an offset amount, calculates a mean per sample [hereinbelow, referred to as a "mean square error (MSE)"] by dividing the sum $\Sigma(y-W)^2$ of the square errors by the number of samples (N), and determines an offset amount in which the mean square error MSE becomes the minimum for a change in offset amount as an optimum offset. In case of Partial Response Class 4 maximum likelihood detection (hereinbelow, referred to as a "PR4ML"), when assuming that the magnetization inversion is set to bit "1" and the non-magnetization inversion is set to bit "0" as a preamble pattern, the measurement pattern writing unit writes a preamble pattern "01010101 . . . " in which "0" and "1" are repeated onto the measuring track. In the offset measurement of the invention, therefore, in case of PR4ML, by using the preamble pattern which is repeated like "01010101 . . . ", a waveform passed through a low pass filter is equivalent to the waveform which was correctly equalized to the Partial Response waveform. Consequently, the mean square error as an evaluation amount does not include any equalization error but includes only a power of noises. When the read head is deviated from the track, a signal decreases and noises relatively increase. Therefore, when the read head correctly enters the on-track state, the value of the mean square error becomes the minimum and the offset amount at that time becomes the optimum offset amount. According to the conventional offset measurement, although the number of sectors in one track is equal to about hundreds of sectors, the number of bits corresponding to the number of samples in the invention is equal to about 1e6, namely, about $1 \times 10^6$ and is remarkably large. The measurement error of the mean square error per sample obtained in the invention is extremely smaller than that of the conventional sector error rate, so that the optimum offset amount can be further accurately obtained.

The optimum offset measuring unit sets a cut-off frequency Fc of a low pass filter which is used for equalization to the Partial Response waveform so as to be substantially the same as a Nyquist frequency fn corresponding to ½ of the sampling frequency fs. As a boost amount Fb of the low pass filter which is used for equalization to the Partial Response waveform, the optimum offset measuring unit sets a peak frequency of filter gain characteristics so as to be matched with a peak frequency of medium noises. By this setting, a signal in which the preamble pattern, medium noises, and circuit noises have been synthesized is outputted as an output of a preamplifier. However, since the circuit noises do not contribute to a change in mean square error at the time of changing the offset amount of the head, by matching the peak of the gain characteristics of the filter with the peak of a power spectrum of the medium noises, a ratio between the medium noises and the circuit noises in the signal after the output from the filter is larger than that before the output from the filter. Consequently, the change amount of the mean square error at the time of offsetting the head increases and the sensitivity of the measurement rises.

The optimum offset measuring unit sets a specific tap coefficient of a transversal filter, for example, an FIR filter (finite impulse response filter) which is used for equalization to the PR4 response waveform to a value other than "0" and sets the remaining tap coefficients to "0", thereby forming simple low pass filter characteristics and enabling the parameters to be simply set. That is, in the conventional offset measurement using random data, since a feedback control of an AGC or a PLL is performed on the basis of the signal equalized to the PR4 response waveform, it is necessary to adjust the equalizer so that the signal read out from the medium can be accurately equalized. According to the invention, however, by using the preamble pattern (dipulse pattern), such as "010101010 . . . " in which "1" is written every two bits, even if a simple low pas filter is used as an initial setting of the equalizer, the same equalization waveform as a PR4 response waveform is outputted and the feedback control of the AGC or PLL is correctly performed, so that the parameters can be easily adjusted.

Prior to the measurement of the mean square error per sample, the optimum offset measuring unit automatically adjusts an automatic control gain of a variable gain amplifier that is used for equalization to the Partial Response waveform and a timing of a PLL circuit (timing recovery circuit) for extracting a read clock by the training due to the reproduction signal of the preamble pattern. Prior to the measurement of the mean square error per sample, the optimum offset measuring unit calculates a mean square error every data frame or data sector on the track in a state where an offset of the head is fixed to a predetermined offset amount over the measuring track, compares it with that of the other frame or sector. When the mean square error is extremely large, such a frame or sector is regarded as a frame or sector having a medium defect and is excluded from the measuring target. In this manner, the mean square error is measured every sector or every frame instead of calculating the mean square error in all of the bits in one cylinder. It is regarded that the sector or frame having the remarkably large mean square error has a medium defect. The influence by the medium defect can be completely eliminated by using the mean in which the values of the units are excluded. The optimum offset measuring unit calculates the mean square error for a plurality of measuring areas where measuring cylinders are uniformly distributed and arranged in the circumferential direction, thereby reducing an influence of a periodic eccentric disturbance such as medium eccentricity or the like. The optimum offset measuring unit measures the optimum offset amounts based on the measurement of the mean square error per sample on at least two tracks on the inner side and outer side of the medium and derives the optimum offsets with respect to the other tracks by a linear interpolating calculation. As mentioned above, by reducing the number of measuring tracks to the necessary minimum limit, a process burden on the offset measurement can be reduced. As measuring tracks, three tracks such as inner track, center track, and outer track are desirable. Although the offset changes by a sine function for a change in yaw angle θy, since a range of the yaw angle is relatively narrower than an arm length of the rotary actuator, it can be sufficiently approximated by the linear interpolation. When a plurality of combination heads are provided, the measurement pattern writing unit and optimum offset measuring unit obtain the optimum offset amount based on the measurement of the mean square error per sample every combination head.

According to the invention, there is also provided an offset measuring method of a magnetic disk apparatus which has combination heads formed by arranging read heads and write heads at an edge of an actuator and in which information is recorded or reproduced while the head is moved to a target track so as to enter an on-track state on the basis of a position signal of a medium demodulated from a reproduction signal of the read head, further at the time of reproduction, the reproduction signal from the read head is Partial Response equalized and, after that, maximum likelihood detected, thereby demodulating information. The measuring method comprises:

a measurement pattern writing step of writing random patterns to adjacent tracks locating on both sides of a measuring track to measure an offset or writing a preamble pattern; and an optimum offset measuring step of obtaining the sum of squares of errors between sampling values of the Partial Response waveform obtained by equalizing the reproduction signal of the preamble pattern and a predetermined ideal sampling value in the case where there is no noise while changing an offset amount of the combination head, subsequently calculating a mean square error per sample by dividing the sum of the square errors by the number of samples, and determining an offset amount in which the mean square error is the minimum for a change in offset amount as an optimum offset.

The details of the offset measuring method are the same as those in the case of the apparatus.

The above and other objects, features, and advantages of the present invention will become more apparent from the following detailed description with reference to the drawings.

BRIEF DESCRIPTION OF THE DRAWINGS

FIG. 6 is an explanatory diagram of track recording patterns in a measuring process in FIG. 2;

FIG. 9 is an explanatory diagram of a measuring region uniformly distributed to the measuring track for presenting an influence of a periodic disturbance PRO such as an eccentricity or the like; and FIGS. 10A and 10B are flowcharts for an offset measuring process according to the invention.

DETAILED DESCRIPTION OF THE PREFERRED EMBODIMENT

Figure 1:
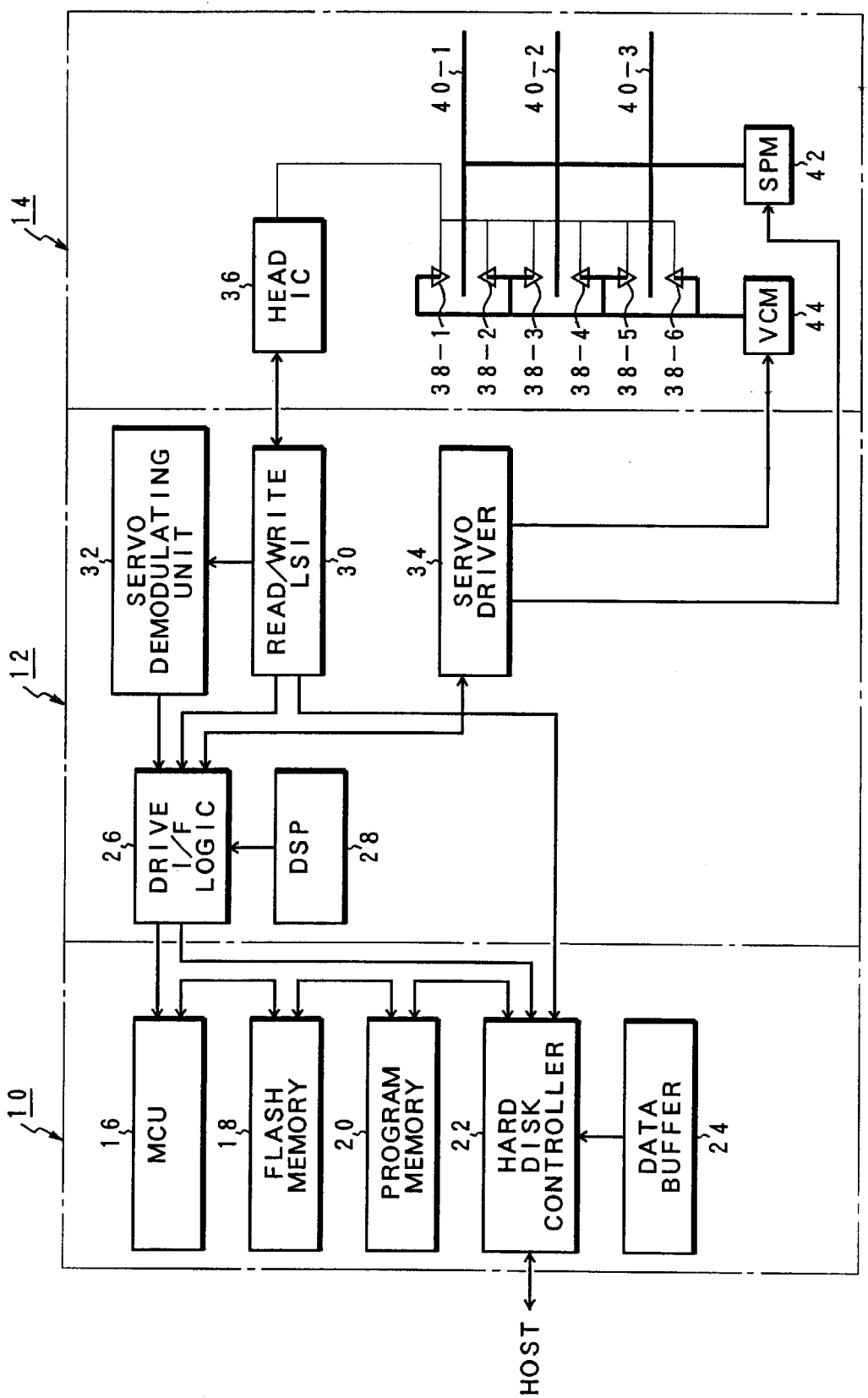
FIG. 1 is a block diagram of a hard disk drive to which the invention is applied.

FIG. 1 is a block diagram of a hard disk drive to which the invention is applied. The hard disk drive is constructed by an SCSI controller 10, a drive control 12, and a disk enclosure 14. The SCSI controller 10 has: an MCU 16; a flash memory 18 which is used for control storage; a program memory 20 in which a control program has been stored; a hard disk controller 22; and a data buffer 24. The drive control 12 has: a drive interface logic 26; a DSP 28; a read/write LSI 30; a servo demodulating unit 32; and a servo driver 34. A head IC 36 is provided for the disk enclosure 14. Combination heads 38-1 to 38-6 each having a write head and a read head are connected to the head IC 36. The combination heads 38-1 to 38-6 are provided for the recording surfaces of magnetic disks 40-1 to 40-3, respectively, and moved to arbitrary track positions of the magnetic disks 40-1 to 40-3 by the driving of a rotary actuator 54 by a VCM 44. The magnetic disks 401 to 40-3 are rotated at a predetermined speed by a spindle motor 42.

The operation of such a hard disk drive is as follows. For example, when considering the case where a write command is issued from a host, the write command is stored into a command queue in the flash memory 18 through the hard disk controller 22. The MCU 16 extracts the write command from the head position of the command queue in the flash memory 18 and requests the host to transfer write data by using the hard disk controller 22. The write data transferred from the host is stored into the data buffer 24. When the storage of the write data into the data buffer 24 is finished, the MCU 16 activates the hard disk controller 22 and writes data onto the magnetic disk 40-1 to 40-3 side. In the writing operation, the write data stored in the data buffer 24 is sent to, for example, the combination head 38-1 through the hard disk controller 22, drive interface logic 26, the writing system of the read/write LSI 30, and head IC 36. At the same time, the DSP 28 controls the servo driver 34 by a servo demodulation signal obtained through the servo demodulating unit 32, thereby positioning the head by the VCM 44 to the track position designated by the write command. Therefore, when the combination head 38-1 is positioned to a target sector designated by the write command, the writing operation of the write data to the disk is executed. When the writing operation is completed, the MCU 16 informs the host of a status indicative of the normal end of the writing of the write data via the hard disk controller 22. When a read command is issued from the host, the MCU 16 extracts the read command, allows the data written at a sector position of the track designated by the read command to be reproduced by a read head provided for, for example, the combination head 38-1 through the hard disk controller 22, drive interface logic 26, writing system of the read/write LSI 30, and head IC 36, and transfers the read-out data to the host.

Figure 2:
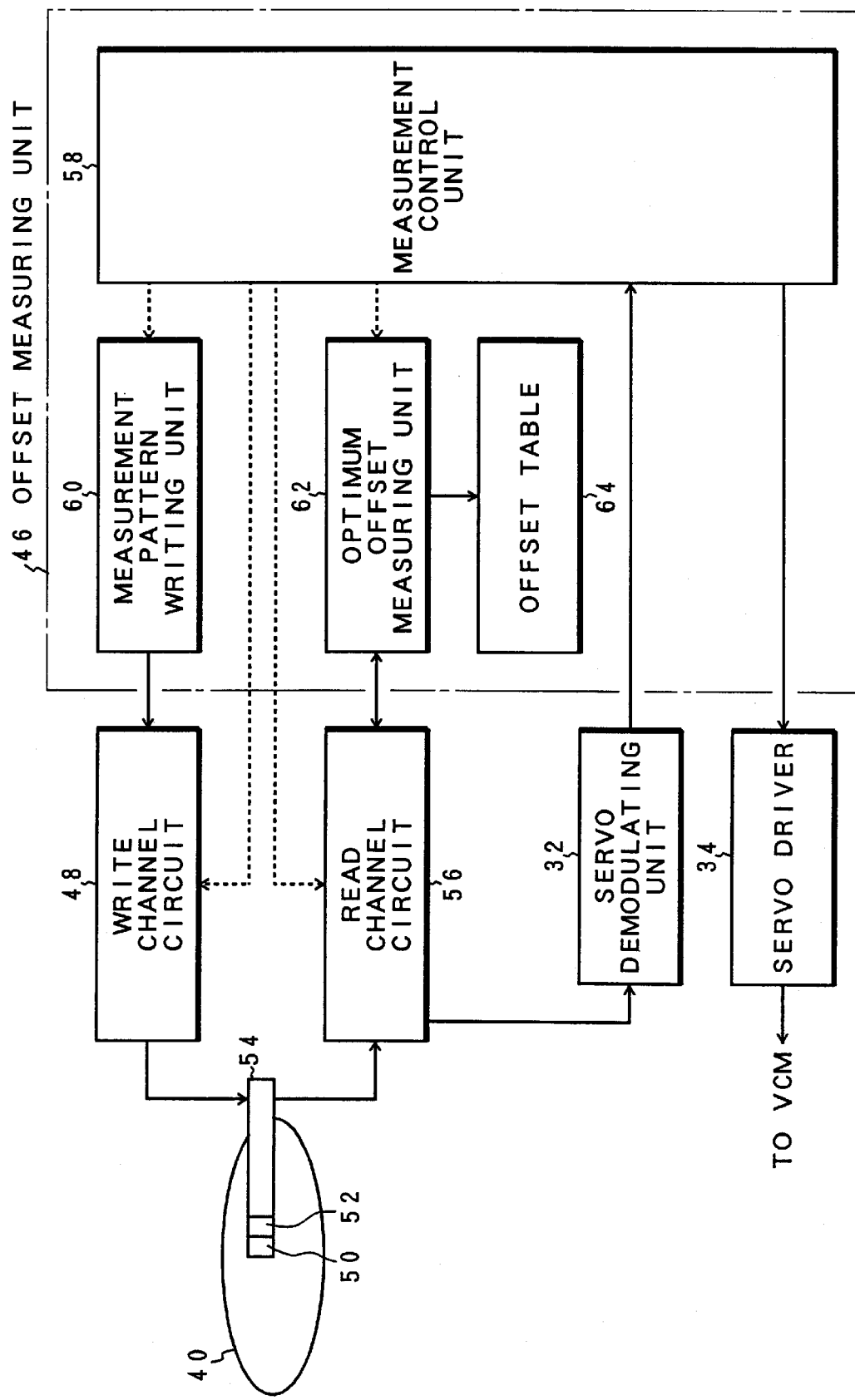
FIG. 2 is a block diagram of an offset measuring function according to the invention.

FIG. 2 is a block diagram of an offset measuring processing function of the invention which is applied to the hard disk drive in FIG. 1. A write channel circuit 48 and a read channel circuit 56 are built in the read/write LSI 30 in FIG. 1. The writing or reading operation of data is performed to/from one magnetic disk 40 shown as an example by a write head 50 and a read head 52 of the combination head attached at an edge of the rotary actuator 54. An inductive head is used as a write head 50. Usually, an MR head is used as a read head 52. An offset measuring unit 46 for offset measurement according to the invention is provided for the write channel circuit 48 and read channel circuit 56. The offset measuring unit 46 is constructed by: a measurement control unit 58; a measurement pattern writing unit 60; an optimum offset measuring unit 62; and an offset table 64 to store measurement results. Since the measurement control unit 58 uses a specific track on the magnetic disk 40 as a measuring track for offset measurement, the combination head can be positioned to a target measuring track by the cooperation of the servo demodulating unit 32 and servo driver 34.

Figure 3A:
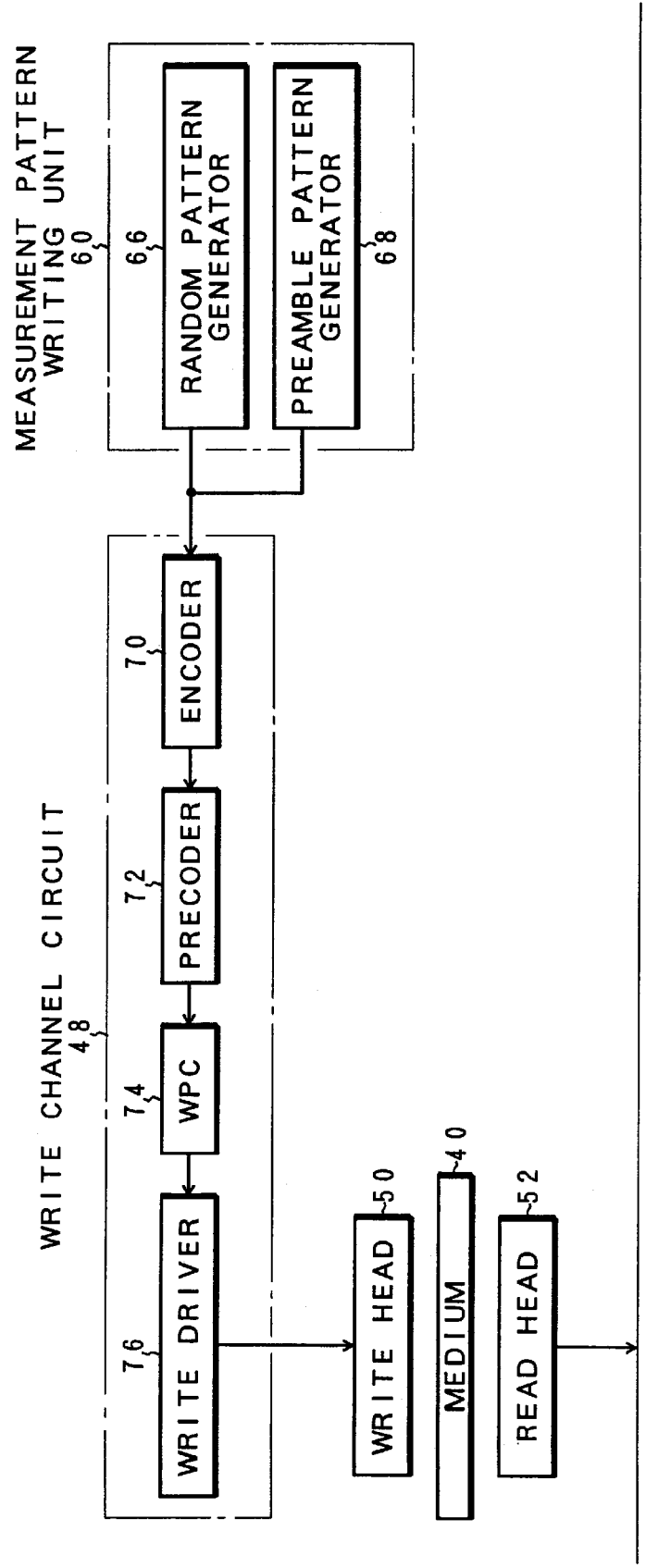
FIGS. 3A and 3B are block diagrams showing the offset measuring function of FIG. 2 together with the details of a write channel and a read channel.
Figure 3B:
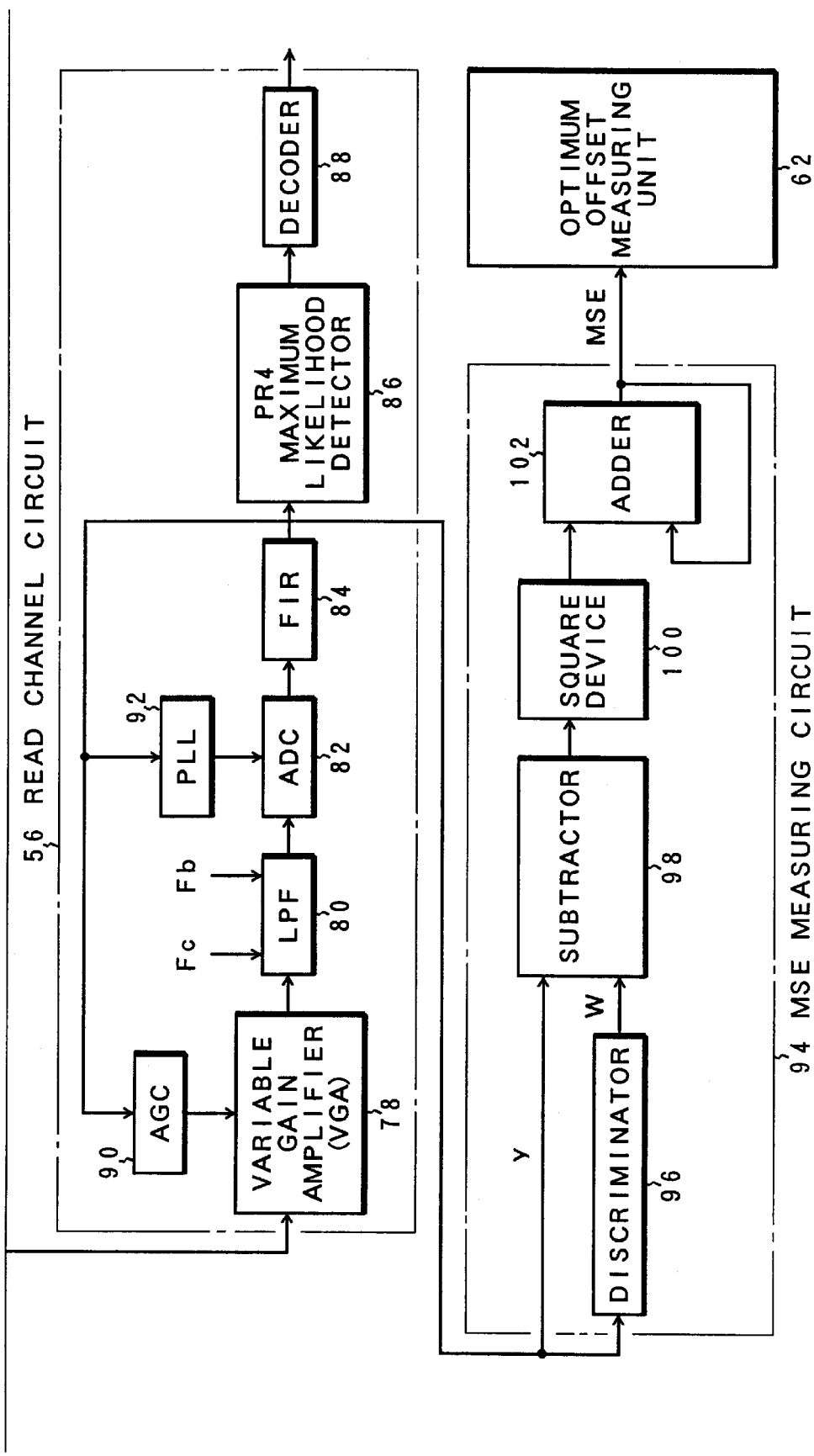

FIGS. 3A and 3B show the offset measuring function in FIG. 2 together with the details of the write channel circuit 48 and read channel circuit 56. The write channel circuit 48 and read channel circuit 56 are shown in case of PR4ML as an example. An encoder 70, a precoder 72, a write compensating circuit 74, and a write driver 76 are provided for the write channel circuit 48. The read channel circuit 56 has: a variable gain amplifier 78; a low pass filter 80; an A/D converter 82 functioning as a sampler; an FIR filter 84 functioning as an equalizer; a maximum likelihood detector 86 for PR4 as a target; a decoder 88; an AGC circuit 90; and a PLL circuit 92. Signal processes by PR4ML in the write channel circuit 48 and read channel circuit 56 will now be briefly explained as follows. The encoder 70 converts the write data into, for example, an 8/9 RLL code. The precoder 72 receives the 8/9 RLL code from the encoder 70 and performs precoding of 1/(1+D). The write compensating circuit 74 delays the rear recording position of magnetization inversion in order to prevent that when the magnetization inversion continues, the rear reproduction signal of the magnetization inversion is shifted forward. For example, now assuming that the magnetization inversion occurs at bit "1", the write driver 76 reverses the direction of a write current which is supplied to the write head 50 each time bit "1" is obtained and magnetically records data onto the magnetic disk 40. The read channel circuit 56 will now be described. A reproduction signal having an impulse waveform serving as a differentiation waveform of a storage signal by a step-like recording current recorded on the magnetic disk 40 by the write head 50 is generated from the read head 52. After the reproduction signal was amplified by the variable gain amplifier 78, high frequency noise components are removed by the low pass filter 80 and the resultant signal is sampled by a sampling frequency by the A/D converter 82 and waveform equalized to a PR4 equalization signal by the FIR filter 84. The FIR filter 84 equalizes the signal so as to perform a Nyquist equalization and a waveform operation of (1+D) as a PR4 waveform equalization. The PR4 equalization signal is inputted to the maximum likelihood detector 86 and an error correction of the signal in which three values of +1, 0, and −1 have been level detected is performed in accordance with a Viterbi algorithm. The data detected by the maximum likelihood detector 86 is demodulated to original data by the decoder 88 and outputted as reproduction data. For such write channel circuit 48 and read channel circuit 56 for PR4ML as a target, the measurement pattern writing unit 60 is first provided for the write channel circuit 48 for the purpose of offset measurement. A random pattern generator 66 and a preamble pattern generator 68 are provided for the measurement pattern writing unit 60. The random pattern generator 66 writes a random pattern onto adjacent tracks locating on both sides of the measuring track. An AC erasure can be performed in place of the random pattern. The preamble pattern generator 68 writes a preamble pattern onto the measuring track. Now, assuming that the magnetization inversion is set to bit "1", a pattern (dipulse pattern) such as "010101 . . . " in which a bit position whose magnetization is inverted is written every two bits is used as a preamble pattern. An MSE measuring circuit 94 and the optimum offset measuring unit 62 are provided on the read channel circuit 56 side for the purpose of offset measurement. The MSE measuring circuit 94 comprises a discriminator 96, a subtractor 98, a square device 100, and an adder 102. The PR4 equalization signal is inputted from the FIR filter 84 to the MSE measuring circuit 94 and an ideal sampling value (W=+1, 0, −1) in case of the absence of noises after the PR equalization is discriminated by the discriminator 96. The subtractor 98 obtains a difference (y−W) between a PR4 equalization signal y and the ideal sampling value W from the discriminator 96. The square device 100 obtains the square $(y-W)^2$ of an output of the subtractor 98. The adder 102 accumulates and adds an output of the square device 100. An accumulation value $\Sigma(y-W)^2$ which is outputted from the MSE measuring circuit 94 is sent to the optimum offset measuring unit 62. A mean square error as a mean value per sample, namely, a mean value per sample of the square value of the difference between the sampling value y after the PR4 equalization and the equalization target value W is calculated as an evaluation value of the optimum offset.

The measurement control unit 58 shown in FIG. 2 obtains the mean square error every offset by the optimum offset measuring unit 62 while changing the offset little by little from the on-track state on the measuring track on which the preamble pattern has been recorded, and determines the offset in which the mean square error becomes the minimum as an optimum offset.

Figure 4:
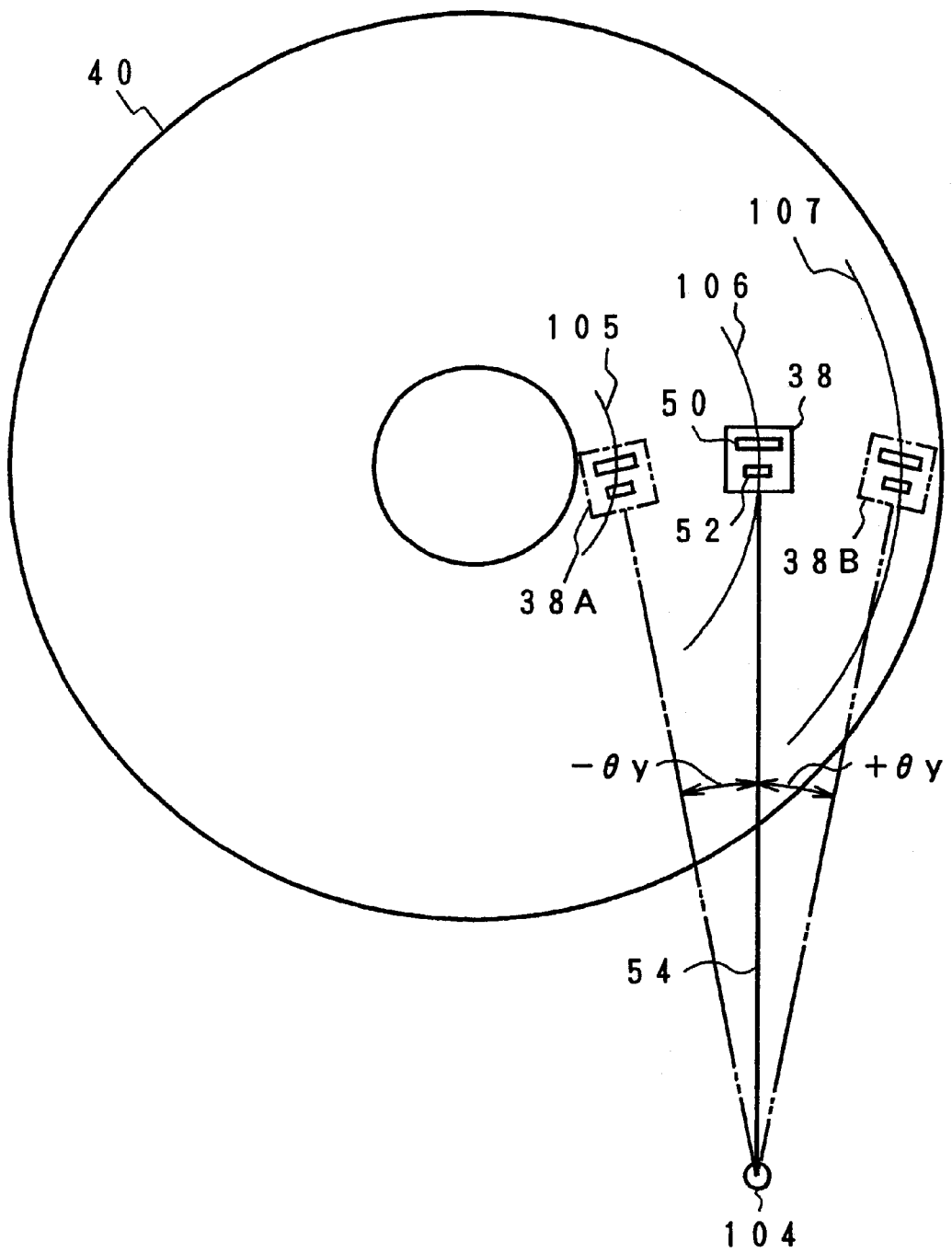
FIG. 4 is an explanatory diagram of an offset which is measured in the invention.
Figure 5:
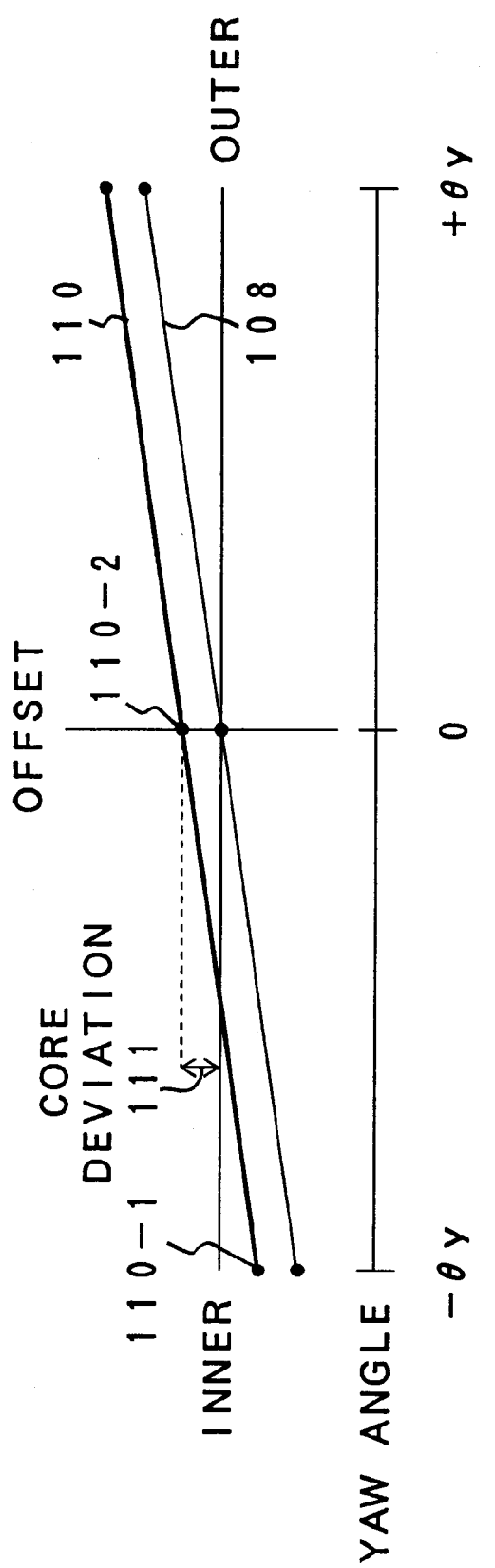
FIG. 5 is an explanatory diagram of a core deviation offset and a yaw angle offset in FIG. 4.

FIG. 4 is an explanatory diagram of an offset which is measured in the invention and shows positioning of the combination head for the track of the magnetic disk 40. A combination head 38 is supported at an edge of the rotary actuator 54 having a rotational center 104. In this state, the write head 50 and read head 52 arranged in the combination head 38 are aligned in the track direction of the magnetic disk 40. The rotary actuator 54 moves the combination head 38 in the radial direction which transverses the tracks between an inner track 105 locating at the innermost position of the magnetic disk 40 and an outer track 107 locating at the outermost position. Now, when a positioning state of the combination head 38 for a center track 106 is used as a reference, an angle when the heads are positioned like combination heads 38A and 38B to the inner track 105 and outer track 107 by the rotary actuator 54 is called a yaw angle. For example, a yaw angle on the inner side is set to (−θy) and a yaw angle on the outer side is set to (+θy). For such a change in yaw angle of the combination head 38 as mentioned above, even if the core centers of the write head 50 and read head 52 coincide, a yaw angle offset occurs. The yaw angle offset is as shown by characteristics 108 in FIG. 5. Although the characteristics 108 are shown by a straight line, they actually draw a sine curve. However, since the yaw angles ±θy are relatively small as shown in FIG. 4 and a length of the rotary actuator 54 is sufficiently long, they can be approximated by a straight line as shown by the characteristics 108 in FIG. 5. In addition to such yaw angle offsets, a deviation usually occurs, around the core center, between the write head 50 and read head 52 separately arranged in the combination head 38, and an offset due to the core deviation is fixedly added to the yaw angle offsets. For example, now assuming that a yaw angle in a state where the combination head 38 is positioned to the center track 106 is set to 0°, at this time, only a core deviation offset 111 appears as shown in FIG. 5. Therefore, the whole offset characteristics become offset characteristics 110 which are shifted from yaw angle offset characteristics 108 by a distance corresponding to the core deviation offset as a fixed component. In the offset measurement of the invention, for example, three tracks of the inner track 105, center track 106, and outer track 107 are designated as measuring tracks as shown in FIG. 4, and an inner offset 110-1, a center offset 110-2, and further, an outer offset 110-3 in FIG. 5 are obtained as optimum offsets, respectively. With respect to the other reliable values, they are obtained by an interpolating calculation by a linear approximation of two adjacent offset points. The measuring points are not limited to three points of the inner, center, and outer points. For example, since the magnetic disk 40 is divided into a plurality of zones in the radial direction, it is also possible to use a method whereby the measuring track is designated every zone, the optimum offset is measured, and as for the tracks other than the measuring tracks, the optimum offset is obtained by an interpolating calculation by the linear approximation between the adjacent measurement offsets.

FIG. 6 is an explanatory diagram of writing patterns on the measuring track and recording tracks according to the invention. Random patterns 118-1 and 118-2 are recorded on adjacent tracks 114 and 116 on both sides of a measuring track 112. In the patterns shown in the diagram, the reproduction signal is shown on the tracks. Now, assuming that the magnetization inversion is set to "1", a preamble pattern 120 which is repeated like "010101 . . . " has been recorded on the measuring track 112 between the adjacent tracks 114 and 116 on which the random patterns 118-1 and 118-2 have been recorded.

Figure 7A:
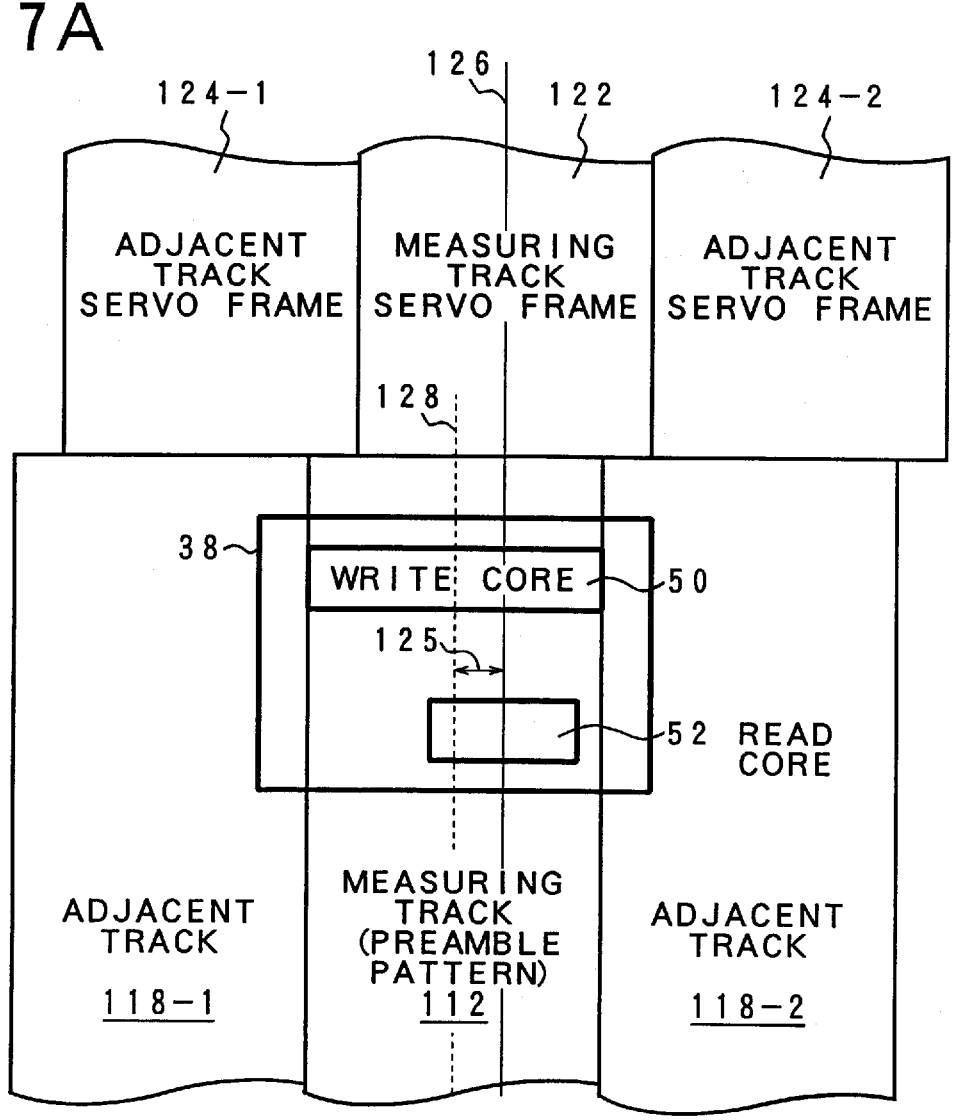
FIGS. 7A and 7B are explanatory diagrams of measurement contents in which a mean square error of a reproduction signal is calculated while offsetting in a measuring track.
Figure 7B:
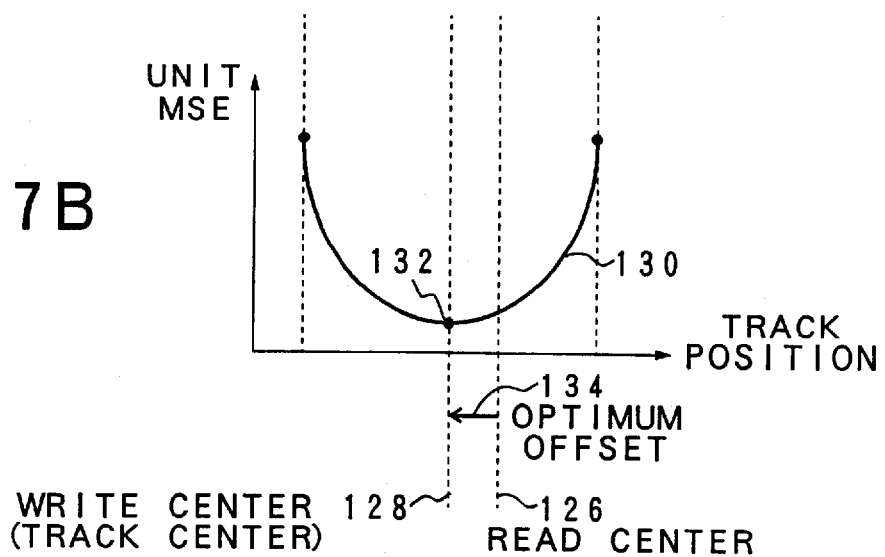

FIGS. 7A and 7B show characteristics for the head positioning to the recording track and the adjacent tracks on which the random pattern and the preamble patterns as shown in FIG. 6 are recorded and the change in offset of the mean square error that is obtained from the head reproduction signal. Since each track of the magnetic disk of the invention has a data surface servo system, servo frames are distributed and arranged in the circumferential direction at regular intervals when they are seen from the track direction, and an interval between the servo frames corresponds to a data frame. FIG. 7A shows a boundary portion of the servo frame and the data frame. The writing operation of the random patterns onto the adjacent tracks 118-1 and 118-2 and the writing operation of the preamble pattern onto the measuring track 112 are on-track controlled on the basis of head position information reproduced from the servo frame by the read head 52 of the combination head 38 so that the core center of the read head 52 coincides with that of a read center 126 which is determined by a measuring track servo frame 122. That is, upon writing, the head is positioned by the demodulation of a position signal from the servo frame 122 by the read head 52 so that the core center of the read head 52 is shifted to the read center 126 so as to enter an on-track state. In this state, for example, the preamble pattern of the measuring track 112 is written as shown in the diagram by using the write head 50. The write head 50 has a write center 128 which is deviated to the left by a distance corresponding to a core deviation 125 from the read center 126 to which the read head is moved so as to enter an on-track state. Therefore, the writing of the preamble pattern onto the measuring track 112 results in a state where a preamble pattern having the write center 128 that is deviated to the right by the distance of the core deviation 125 from the read center 126 of the read head 52 is written. In the case where the preamble pattern written as a measuring track 112 by the write head 50 as mentioned above is read out by the read head 52, it is similarly read out in a state where the read head 52 is moved to the read center 126 of the measuring track servo frame 122 so as to enter an on-track state. However, the center of the measuring track 112 at this time is located at the write center 128 that is shifted to the right by the distance corresponding to the core deviation 125 and it is an inherent track center to move the read head 52 so as to enter an on-track state. In the measuring process of the invention, the mean square error is obtained from the reproduction signal while the offset amount is increased to the inner side and outer side by a predetermined amount at a time in a state where the read head 52 is moved to the read center 126 decided by the position signal from the measuring track servo frame 122 so as to enter an on-track state.

FIG. 7B shows measuring characteristics 130 of the mean square error obtained by offsetting the read head 52. A value of the MSE measuring characteristics 130 decreases as the read head 52 approaches the write track center and an MSE minimum value 132 is obtained in a state where the head is offset and moved to the write center 128 so as to enter an on-track state. In the invention, therefore, an offset 134 which gives the minimum value with respect to the mean square errors obtained while offsetting the read head 52 is determined as an optimum offset.

Figure 8:
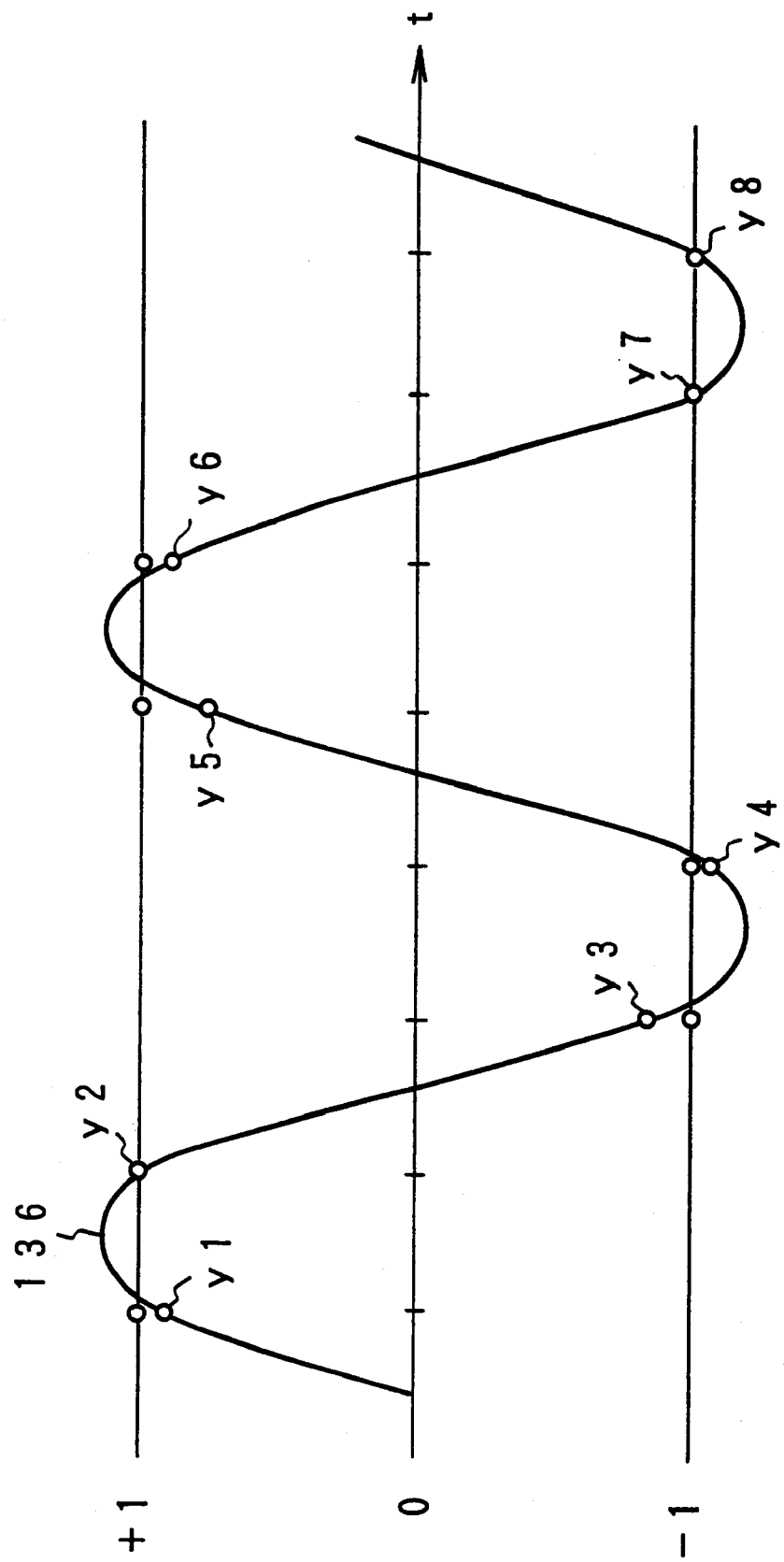
FIG. 8 is an explanatory diagram of a sampling error between an equalization waveform of Partial Response Class 4 and an ideal value.

FIG. 8 is an explanatory diagram of an equalization pattern and sampling values in the case where a difference between the sampling value y after the PR4 equalization and the ideal sampling value W having no noise is obtained by the subtractor 98 provided in the MSE measuring circuit 94 in FIGS. 3A and 3B. Three values of +1, 0, and −1 are set as ideal sampling values W for a PR4 equalization waveform 136. For such ideal sampling values W=+1, 0, and −1, the actual PR4 equalization waveform 136 has sampling values y1 to y8 at sampling points. With respect to the five sampling values y1, y3, y4, y5, and y6 among them, an error occurs for the ideal sampling value W=+1 or −1, the errors are accumulated, and the mean square error per sample is finally calculated by dividing the accumulated errors by the number of samples.

Figure 9:
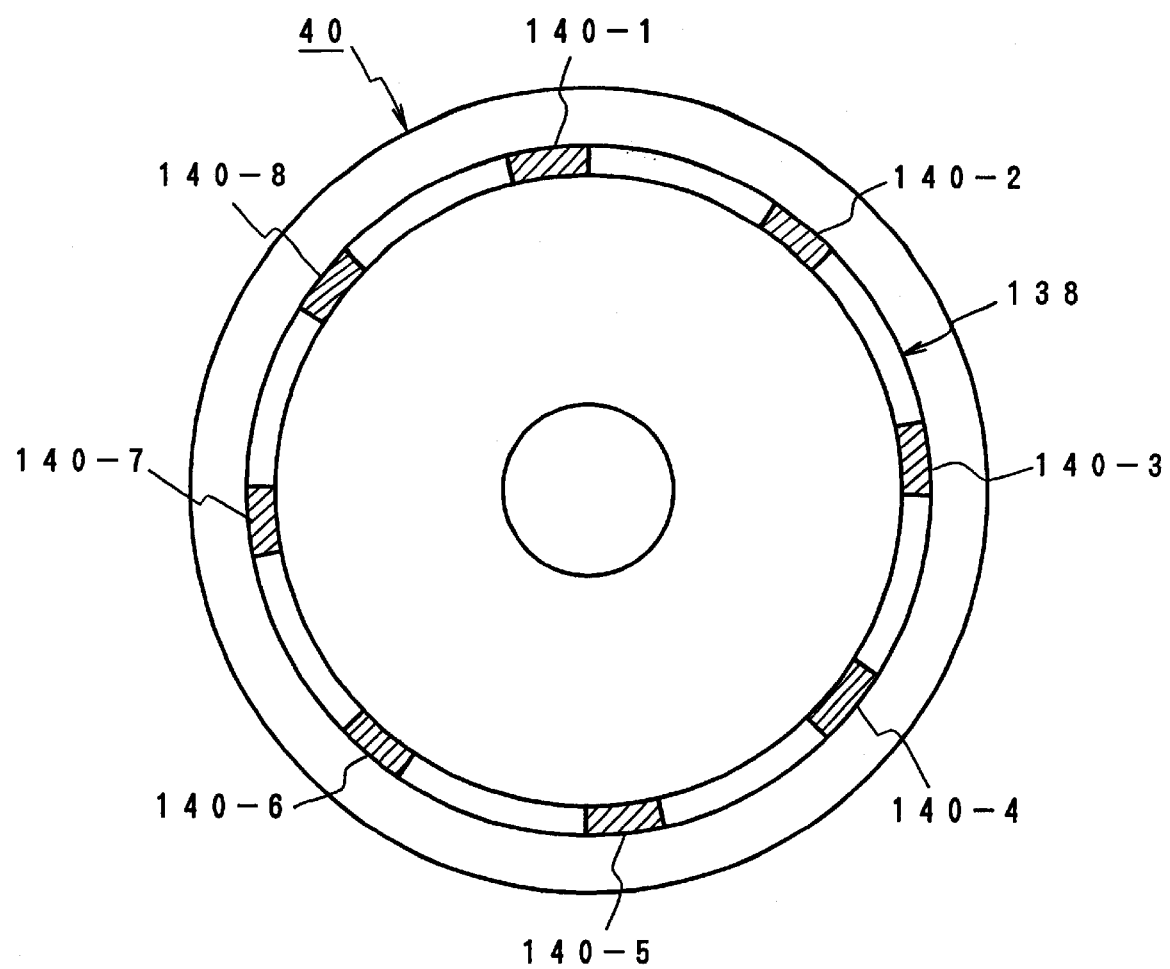

FIG. 9 is an explanatory diagram of measuring areas on the measuring track on the magnetic disk according to the invention. For example, when a measuring track 138 is designated on the magnetic disk 40, to reduce an offset fluctuation during the measurement due to the periodic disturbance by an eccentricity of the magnetic disk 40, measuring areas 140-1 to 140-8 are distributed and allocated to, for example, eight positions in the circumferential direction of the measuring track 40. Since it is presumed that a defect exists at a specific position of the measuring track 138, it is necessary to exclude the region corresponding to the defective unit from the measuring target. In the exclusion of the region of the measuring track corresponding to the defective unit, the measurement of the mean square error by the MSE measuring circuit 94 in FIGS. 3A and 3B is performed on a frame or sector unit basis in a state where the offset is fixed to a predetermined offset. If the defective frame or sector is found in the measurement of the mean square error in the state where the offset of the frame or sector unit is fixed, errors due to the defect increase extremely, so that the mean square error of the frame or sector where the defect exists indicates an extreme value as compared with those of the other normal frames or sectors. Therefore, the frame or sector in which the mean square error shows an extremely large value in this measurement is regarded as a frame or sector having a defect and excluded from the measurement target in which the optimum offset is measured.

Figure 10A:
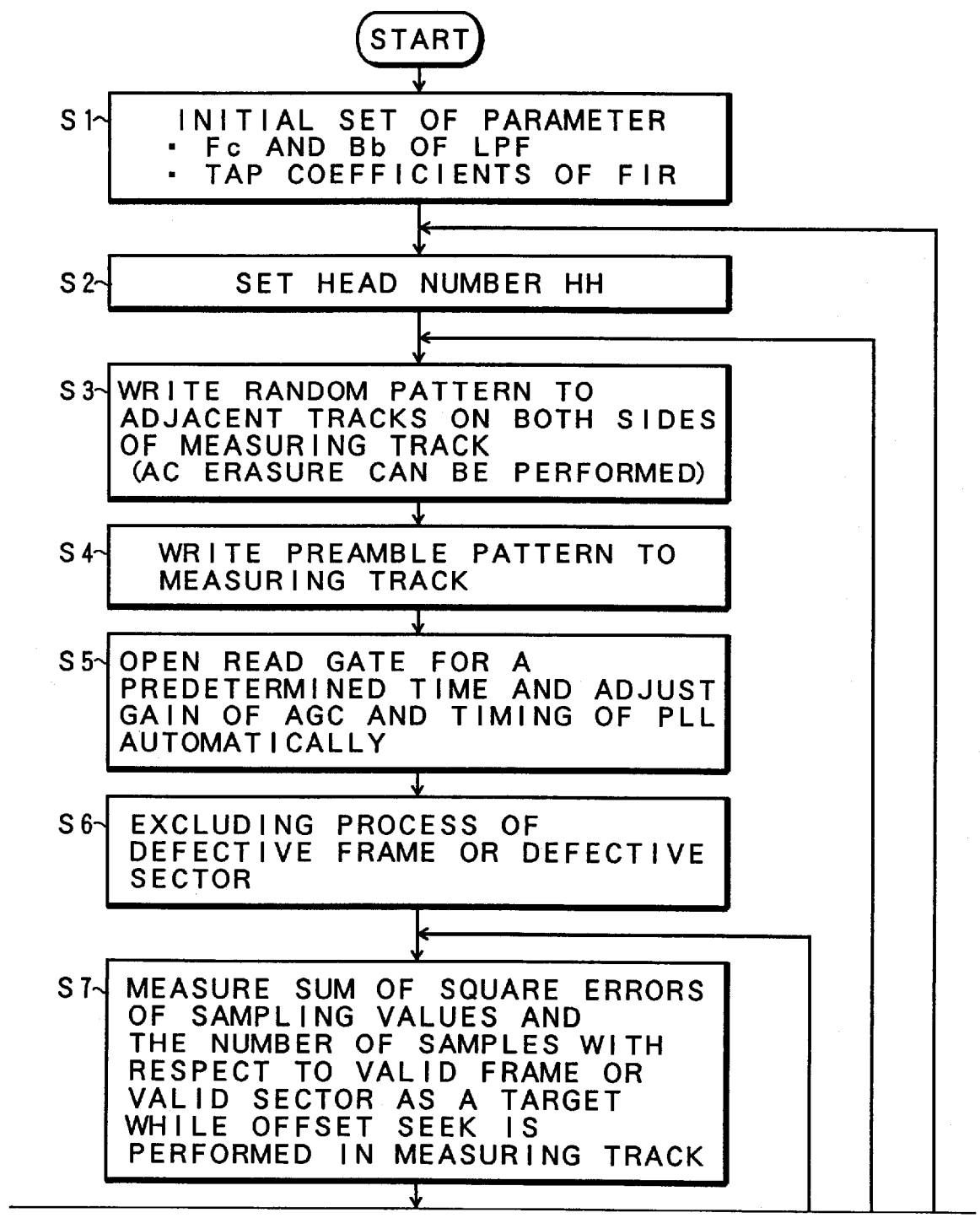

The offset measuring process according to the invention will now be described with reference to flowcharts of FIGS. 10A and 10B. The offset measuring process is performed by using adjusting facilities and testing facilities in an adjusting step at the final stage of a manufacturing step of the hard disk drive. First, in step S1, parameters are initially set. In the initial setting of the parameters, a cut-off frequency Fc and a boost amount Fb of the low pass filter 80 provided in the read channel circuit 56 in FIGS. 3A and 3B are set and tap coefficients of the FIR filter 84 are set. The cut-off frequency Fc of the low pass filter 80 is set to ½ of a Nyquist frequency fn, namely, a sampling frequency fs. In this case, it is desirable to set the cut-off frequency Fc to a value smaller than the Nyquist frequency fn. Thus, a harmonic distortion due to the vertical asymmetry in case of using the MR head as a read head can be suppressed. The cut-off frequency Fc can be also set to be slightly higher than the Nyquist frequency fn. The boost amount Fb of the low pass filter 80 is set so that the peak frequency of gain characteristics of the filter coincides with the peak frequency of a power spectrum of medium noises. Therefore, since the power spectrum of noises of the disk medium is almost determined every material of the medium prior to the initial setting of the parameters, the boost amount Fb is set so that the peak frequency of the filter gain characteristics of the low pass filter 80 coincides with the peak frequency of the power spectrum by using the power spectrum of the medium noises which have previously been measured by another magnetic disk having the same kind of material. Subsequently, in the setting of the tap coefficients of the FIR filter 84, since this filter is used to PR4 equalize the reproduction signal and is not concerned with the offset measuring process of the invention, they are set so as to flatten the gain characteristics. That is, only one of the tap coefficients of the FIR filter 84 is set to a value other than "0" and the remaining tap coefficients are set to "0". In this case as well, the peak frequency of the gain characteristics of the FIR filter 84 can be set so as to coincide with the peak frequency of the power spectrum of the medium noises in a manner similar to the case of the low pass filter 80. Default set values are used as other parameters. In step S2, the first head number HH to measure the offset is set. In step S3, the head is sequentially positioned to the adjacent tracks locating on both sides of the center measuring track with respect to the measuring track, for example, the inner track in FIG. 4 and the random pattern is written. In place of writing the random pattern to the adjacent tracks, the AC erasure can be performed. In the writing of the random pattern to the adjacent tracks or the AC erasure, by increasing the mean square error measured by the seek on the measuring track step by step, boundary information indicative of a range of the measuring track to measure the offset is given. Since the medium noises become the smallest in case of a DC erasure, on the other hand, the components which contribute to the increase in mean square error which is performed while offsetting on the measuring track are components only due to an amplitude phenomenon of the preamble pattern and the sensitivity deteriorates, so that it is undesirable. However, the invention can be also embodied by the DC erasure. The preamble pattern is subsequently written to the measuring track in step S4. The writing process of the measuring pattern is, consequently, finished. In step S5, the reproduction signal from the read head is read out by opening a read gate for a predetermined time, and gain for the variable gain amplifier 78 is automatically adjusted by the AGC circuit 90. A sampling timing for the A/D converter 82 is automatically adjusted by the PLL circuit 92. It is desirable that the interval during which the read gate is opened in this case is set to a time that is integer times as long as the time which is required for the magnetic disk to rotate once. The gain for the variable gain amplifier 78 and the sampling timing for the A/D converter 82 are automatically adjusted so that the sampling values are equal to ±1 by the automatic adjustment by the AGC circuit 90 and PLL circuit 92. At this time, the discriminator 96 provided in the MSE measuring circuit 94 outputs the ideal sampling value W=1 when the sampling value which is outputted from the FIR filter 84 is equal to 0 or more as a PR4 equalization signal. The discriminator 96 outputs the ideal sampling value W=−1 when the sampling value as a PR4 equalization signal is less than 0. That is, an output of the discriminator 96 becomes an ideal value after the PR4 equalization A difference between the ideal value and the sampling value y of the actual PR4 equalization signal is obtained by the subtractor. The square device 100 and adder 102 are closed and the accumulation value can be outputted to the optimum offset measuring unit 62. Subsequently, in step S6, a process for excluding the defective frame or defective sector in the measuring track is performed. In the defect excluding process, the read gate is opened in a state where a predetermined offset is given to the head, the reproduction signal from the read head 52 is supplied to the read channel circuit 56, and the mean square error is calculated from the PR4 equalization signal on a frame or sector unit basis by the MSE measuring circuit 94 and optimum offset measuring unit 62. If there is the frame or sector with the defect, since the value of the mean square error increases extremely, such a frame or sector is regarded as a defective frame or defective sector and excluded from the offset measurement target. In the optimum offset measuring unit 62, the mean square error per sample is calculated by dividing the sum of the squares of the differences between the sampling values after the PR4 equalization measured from the MSE measuring circuit 94 and the ideal sampling value by the number of samples. However, the number of samples in this case can be obtained by multiplying the time during which the read gate is opened by the sampling frequency. In step S7, while performing the offset seek in the measuring track, the sum $\Sigma(y-W)^2$ of the square errors between the sampling values and the ideal sampling value and the number of samples (N), namely, (the number of samples $N$)=(read gate opening interval)×(sampling frequency)

are measured by the MSE measuring circuit 94 with respect to the valid frames or valid sectors excluding the defective frame. In step S8, the mean value MSE per sample of the equalization errors is calculated. In step S9, a check is made to see if the measurement by the seek at all of the offset positions in the measuring track has been finished. The processes in steps S7 and S8 are repeated until the measurement at all of the offset positions is finished. The offset interval is determined at a proper change pitch of the offset seek corresponding to the resolution of the head position signal which is demodulated from the servo frame. When the measurement by all offset seek is finished in step S9, step S10 follows and the offset of the minimum one of a plurality of mean square errors is set to the optimum offset. In step S11, a check is made to see if the measuring process with respect to all measuring tracks, for example, the inner track, center track, and outer track has been finished. If the measuring process is not finished, the processing routine is returned to step S3 in FIGS. 10A and 10B and similar processes are repeated with regard to the next measuring track. In step S11, if the processes for all measuring tracks are finished, step S12 follows and the measurement about all heads has been finished. If it is not finished, the processing routine is returned to step S2 and the next head number is set and similar processes are repeated. According to the invention as mentioned above, the mean square error per sample obtained by dividing the sum of the squares of the differences between the sampling values after the PR equalization and the ideal sampling value by the number of samples is used as an evaluation amount, and the offset of the minimum mean square error is set to the optimum offset while offset seeking in the measuring track. Therefore, the number of bits which gives the number of samples in one track is extremely large to be about $1 \times 10^6$. By obtaining the mean of them, the measurement errors are remarkably reduced. Even if each parameter of the read channel is in a default setting state, the offset depending on the core deviation and the yaw angle can be accurately measured by the relatively simple setting of the parameters.

The mean square error is obtained on a frame or sector unit basis in the state where the offset is fixed in the measuring track. When it has an extremely large value, such a frame or sector is regarded as a defective frame or sector and excluded from the measurement target, so that the offset amount can be accurately measured without causing a measurement error due to the medium defect or the like. Thus, the influence by the medium defect on the offset measurement can be almost perfectly eliminated.

Further, as a parameter setting of the read channel, the cut-off frequency is set to the Nyquist frequency that is equal to ½ of the sampling frequency and a boost setting to match the peak of the gain characteristics of the low pass filter with the peak of the power spectrum of the medium noises is performed, so that the signal in which the preamble pattern of the measuring track, medium noises, and circuit noises have been synthesized is generated as a reproduction signal from the head which was amplified by the preamplifier. However, since the circuit noises do not contribute to the change in mean square error at the time of changing the offset amount of the head, so that a ratio between the medium noises and the circuit noises in the output signal from the low pass filter can be set to be sufficiently larger than that of the filter input signal. Therefore, the mean square error which is calculated when the head is offset in the measuring track is increased and the measuring sensitivity can be raised.

Although the above embodiment has been described with respect to the magnetic disk apparatus using PR4ML as an example, with respect to another magnetic disk apparatus using EPR4ML, EEPR4ML, or the like, it is also possible to similarly perform the offset measuring process for calculating the mean square error per sample while offset seeking in the measuring track and determining the offset amount of the minimum mean square error value as an optimum offset.

The present invention incorporates all of modifications within the scope of the invention without losing the objects and advantages of the invention. Further, the invention is not limited by the numerical values shown in the embodiment.

What is claimed is:

1. A magnetic disk apparatus which has combination heads formed by arranging read heads and write heads at an edge of an actuator in a track direction and in which information is recorded or reproduced while the head is positioned to a target track so as to enter an on-track state on the basis of a position signal of a medium demodulated from a reproduction signal of said read head, further upon reproduction, the reproduction signal from said read head is equalized to a Partial Response waveform, and after that, it is maximum likelihood detected, thereby demodulating information, comprising:

a measurement pattern writing unit for writing random patterns to adjacent tracks locating on both sides of a measuring track whose offset is measured or writing a preamble pattern to said measuring track; and an optimum offset measuring unit for obtaining the sum of the squares of errors between sampling values of the Partial Response waveform obtained by equalizing the reproduction signal of said preamble pattern and a predetermined ideal sampling value in the case where there is no noise while changing an offset amount of said combination head, calculating a mean per sample by dividing the sum of said square errors by the number of samples, and determining an offset amount in which said mean becomes the minimum for a change in said offset amount as an optimum offset.

2. An apparatus according to claim 1, wherein in case of a Partial Response Class 4 maximum likelihood detection, said measurement pattern writing unit writes a preamble pattern in which "0" and "1" are repeated onto said measuring track as said preamble pattern in the case where a magnetization inversion is set to bit "1" and a non-magnetization inversion is set to bit "0".

3. An apparatus according to claim 1, wherein said optimum offset measuring unit sets a cut-off frequency of a low pass filter which is used for equalization to said Partial Response waveform so as to be substantially the same as a Nyquist frequency that is equal to ½ of a sampling frequency.

4. An apparatus according to claim 3, wherein said optimum offset measuring unit sets a boost amount of said low pass filter which is used for the equalization to said Partial Response waveform so that a peak frequency of filter gain characteristics is matched with a peak frequency of medium noises.

5. An apparatus according to claim 1, wherein said optimum offset measuring unit sets a specific tap coefficient of a transversal filter which is used for equalization to said Partial Response waveform to a value other than "0" and sets remaining tap coefficients to "0", thereby setting simple low pass filter characteristics.

6. An apparatus according to claim 1, wherein prior to measuring said mean square error per sample, said optimum offset measuring unit automatically adjusts an automatic control gain of a variable gain amplifier which is used for equalization to said Partial Response waveform and a timing of a PLL circuit to extract a read clock by training by the reproduction signal of said preamble pattern.

7. An apparatus according to claim 1, wherein prior to measuring said mean square error per sample, said optimum offset measuring unit calculates said mean square error every data frame or data sector in a state where an offset of said head is fixed to a predetermined offset amount on said measuring track and compares said mean square error with that of another frame or sector, and in the case where said mean square error is extremely larger than those of another frame or sector, said optimum offset measuring unit regards that said frame or sector has a medium defect and excludes said frame or sector from a measuring target.

8. An apparatus according to claim 1, wherein said optimum offset measuring unit calculates said mean square error MSE for a plurality of measuring areas in which measuring cylinders are uniformly distributed and arranged in the circumferential direction as targets, thereby reducing an influence of a periodic eccentricity disturbance.

9. An apparatus according to claim 1, wherein said optimum offset measuring unit measures an optimum offset amount based on the measurement of said mean square error per sample with respect to at least two tracks on the inner side and the outer side of said medium, and obtains an optimum offset by a linear interpolating calculation with respect to the other tracks.

10. An apparatus according to claim 1 or 9, wherein in the case where a plurality of said combination heads are provided, said measuring pattern writing unit and said optimum offset measuring unit obtain the optimum offset amount based on the measurement of said mean square errors per sample every said combination head.

11. An offset measuring method of a magnetic disk apparatus which has combination heads formed by arranging read heads and write heads at an edge of an actuator and in which information is recorded or reproduced while the head is positioned to a target track so as to enter an on-track state on the basis of a position signal of a medium demodulated from a reproduction signal of said read head, further upon reproduction, the reproduction signal from said read head is equalized to a Partial Response waveform, and after that, it is maximum likelihood detected, thereby demodulating information, comprising:

a measurement pattern writing step of writing random patterns to adjacent tracks locating on both sides of a measuring track whose offset is measured or writing a preamble pattern to said measuring track; and an optimum offset measuring step of obtaining the sum of the squares of errors between sampling values of the Partial Response waveform obtained by equalizing the reproduction signal of said preamble pattern and a predetermined ideal sampling value in the case where there is no noise while changing an offset amount of said combination head, calculating a mean per sample by dividing the sum of said square errors by the number of samples, and determining an offset amount in which said mean becomes the minimum for a change in said offset amount as an optimum offset.

12. A method according to claim 11, wherein in case of a Partial Response Class 4 maximum likelihood detection, in said measurement pattern writing step, a preamble pattern in which "0" and "1" are repeated is written onto said measuring track as said preamble pattern in the case where a magnetization inversion is set to bit "1" and a non-magnetization inversion is set to bit "0".

13. A method according to claim 11, wherein in said optimum offset measuring step, a cut-off frequency of a low pass filter which is used for equalization to said Partial Response waveform is set so as to be substantially the same as a Nyquist frequency that is equal to ½ of a sampling frequency.

14. A method according to claim 13, wherein in said optimum offset measuring step, a boost amount of said low pass filter which is used for the equalization to said Partial Response waveform is set so that a peak frequency of filter gain characteristics is matched with a peak frequency of medium noises.

15. A method according to claim 11, wherein in said optimum offset measuring step, a specific tap coefficient of a transversal filter which is used for equalization to said Partial Response waveform is set to a value other than "0" and remaining tap coefficients are set to "0", thereby setting simple low pass filter characteristics.

16. A method according to claim 11, wherein prior to measuring said mean square error MSE per sample, in said optimum offset measuring step, an automatic control gain of a variable gain amplifier which is used for equalization to said Partial Response waveform and a timing of a PLL circuit to extract a read clock are automatically adjusted by training by the reproduction signal of said preamble pattern.

17. A method according to claim 11, wherein prior to measuring said mean square error per sample, in said optimum offset measuring step, said mean square error is calculated every data frame or data sector in a state where an offset of said head is fixed to a predetermined offset amount on said measuring track and compared with that of another frame or sector, and in the case where said mean square error is extremely larger than those of another frame or sector, it is regarded that said frame or sector has a medium defect, and said frame or sector is excluded from a measuring target.

18. A method according to claim 11, wherein in said optimum offset measuring step, said mean square error is calculated for a plurality of measuring areas in which measuring cylinders are uniformly distributed and arranged in the circumferential direction as targets, thereby reducing an influence of a periodic eccentricity disturbance.

19. A method according to claim 11, wherein in said optimum offset measuring step, an optimum offset amount based on the measurement of said mean square error per sample is measured with respect to at least two tracks on the inner side and the outer side of said medium, and an optimum offset is obtained by a linear interpolating calculation with respect to the other tracks.

20. A method according to claim 11 or 19, wherein in the case where a plurality of said combination heads are provided, in said measuring pattern writing step and said optimum offset measuring step, the optimum offset amount based on the measurement of said mean square errors per sample is obtained every said combination head.

* * * * *